UNITED STATES PATENT OFFICE.

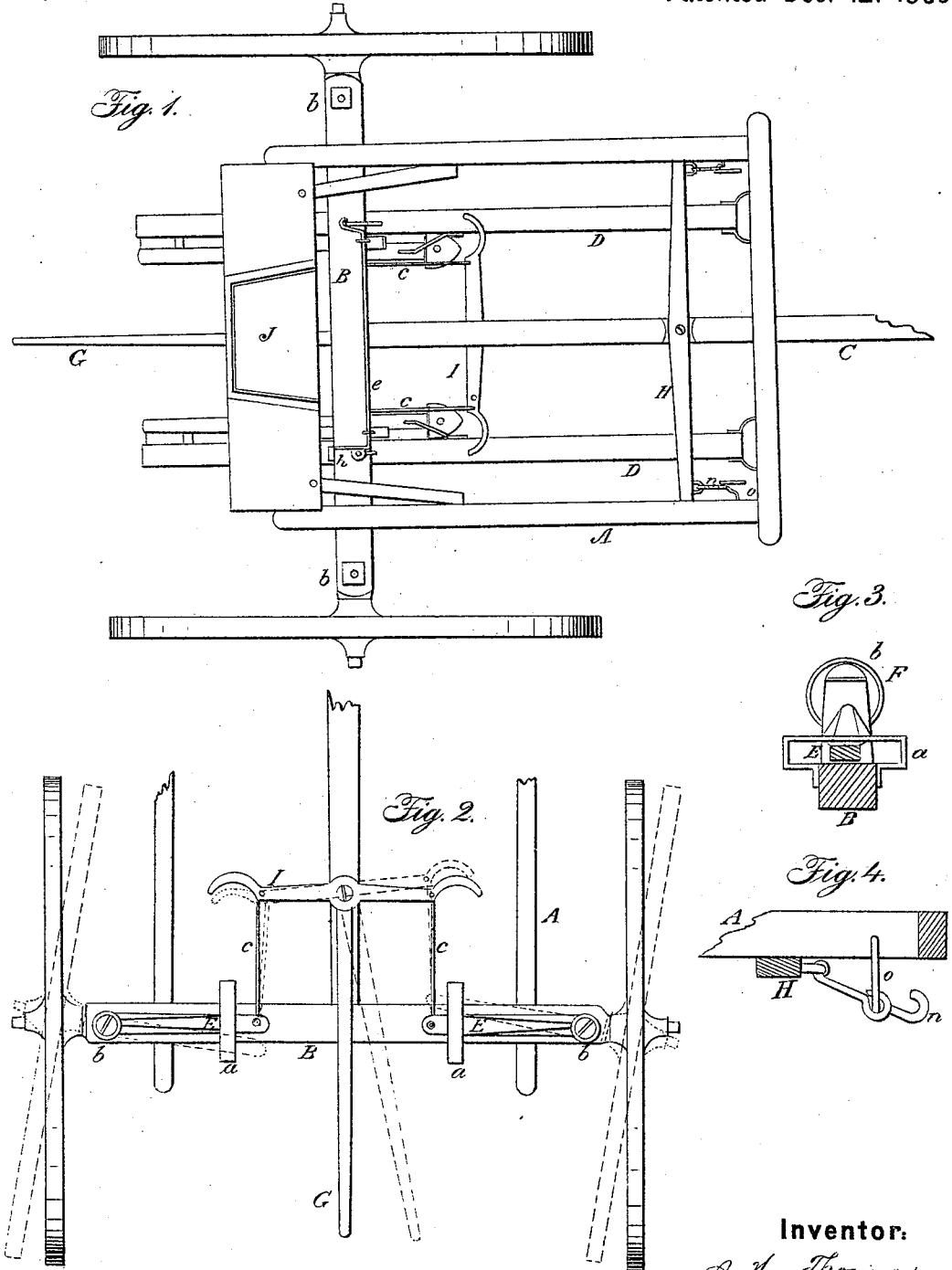

J. H. THOMAS, P. P. MAST, AND THOMAS HARDING, OF SPRINGFIELD, OHIO.

IMPROVEMENT IN CULTIVATORS.

Specification forming part of Letters Patent No. 51,494, dated December 12, 1865.

*To all whom it may concern:*

Be it known that we, J. H. THOMAS, P. P. MAST, and THOMAS HARDING, of Springfield, in the county of Clarke and State of Ohio, have invented certain new and useful Improvements in Cultivators; and we do hereby declare that the following is a full, clear, and exact description thereof, reference being had to the accompanying drawings, and to the letters of reference marked thereon, making part of this specification—

Figure 1 being a top-plan view; Fig. 2, a bottom-plan view, and Figs. 3 and 4 are views of portions detached.

Our invention consists in attaching the wheels to short pivoted axles connected by a series of rods and a lever for turning the wheels to the right or left, and in a novel arrangement of draft-rods for attaching the team, and various details to render the same operative.

To enable others skilled in the art to construct and use our invention, we will proceed to describe it.

A represents the frame, which consists of the two side bars and a front cross-bar attached rigidly to the axle-tree B at the rear, and to the tongues C, at front, as shown in Fig. 1.

To the front of the frame two plow-beams, D, are pivoted in such a way as to permit of their having a vertical but not a lateral play. To these beams the shovels are attached in the usual manner, two to each.

The wheels are mounted on short iron axles E, which are pivoted one at each end to the under side of the main axle-tree B, as shown in Fig. 2. At the point where the bolt *b* passes through the axle E the latter is enlarged vertically, as shown by F of Fig. 3, so as to hold them firmly in position.

Near the inner ends of the axles E metallic loops *a* are secured to the under side of B in such a position as to inclose the end of E, as shown in Figs. 2 and 3, these loops or guides *a* being of sufficient length to permit the necessary movement of E back and forth therein, and so arranged as to hold the inner end of E close up to the under side of the axle-tree B.

To the inner ends of the axles E rods *c* are pivoted, from whence they extend forward, and have their other ends pivoted to the lever I, which is pivoted at its center to the tongue C, as shown in Figs. 1 and 2. This lever I has its ends curved, as shown, to afford a secure hold for the feet of the driver, who sits upon the seat J when driving.

By pressing with either foot upon one end of the lever I the wheels will be turned either to the right or left, as indicated in red, whereby the cultivator will be moved obliquely and made to approach or recede from the row, as may be desired.

A handle or lever, G, is rigidly attached to the lever I and made to protrude back of the axle, by which the the driver is enabled to control the movements of the wheels when walking behind the implement.

H represents a sway-bar, which is pivoted to the tongue as shown in Fig. 1. To each end of this bar H a draft-rod, *n*, is attached, as shown in Fig. 4, the rod *n* being supported midway by a short vertical rod, *o*, which has its upper end pivoted to the side bar of the frame A near its front ends, as shown. The front end of the rods *n* terminate in a hook, to which the animals are attached, one to each.

Having thus fully described our invention, what we claim is—

1. The independent short axles E, provided with the projection F, and secured to the main axle B, in the manner shown and described.

2. The combination of axles E, rods *c*, and lever I, as shown and described.

3. The lever G, in combination with the lever I, rod *c*, and axles E, arranged and operating as set forth.

J. H. THOMAS.
    P. P. MAST.
    THOMAS HARDING.

Witnesses:
 GEO. ARHTUR,
 JOS. W. THOMAS.